United States Patent
Guay et al.

(10) Patent No.: US 6,766,318 B1
(45) Date of Patent: Jul. 20, 2004

(54) APPROACH FOR COLLECTING STATISTICAL INFORMATION IN INFORMATION SYSTEMS

(75) Inventors: Todd Guay, Nashua, NH (US); Jonathan Soule, Belmont, CA (US); Yong Feng, Foster City, CA (US); Vipul Shah, Mountain View, CA (US); Geoffrey Wilson, Nashua, NH (US); Jay Rossiter, Palo Alto, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 10/366,794

(22) Filed: Feb. 13, 2003

Related U.S. Application Data

(62) Division of application No. 09/266,703, filed on Mar. 11, 1999, now Pat. No. 6,553,369.

(51) Int. Cl.[7] .................................................. G06F 17/30
(52) U.S. Cl. ............................ 707/3; 707/10; 707/100; 707/102; 707/104.1
(58) Field of Search ................. 707/1, 2, 3, 100–104.1, 707/201–206

(56) References Cited

U.S. PATENT DOCUMENTS

| | | | |
|---|---|---|---|
| 5,325,292 A | | 6/1994 | Crockett |
| 5,625,820 A | * | 4/1997 | Hermsmeier et al. ........ 707/202 |
| 5,778,350 A | * | 7/1998 | Adams et al. ................. 707/1 |
| 5,873,091 A | | 2/1999 | Garth et al. |
| 5,899,986 A | * | 5/1999 | Ziauddin ....................... 707/2 |
| 5,940,832 A | * | 8/1999 | Hamada et al. ............. 707/200 |
| 5,991,733 A | | 11/1999 | Aleia et al. |
| 6,003,022 A | * | 12/1999 | Eberhard et al. ............... 707/2 |
| 6,035,306 A | * | 3/2000 | Lowenthal et al. ......... 707/200 |
| 6,070,160 A | | 5/2000 | Geary |
| 6,085,191 A | * | 7/2000 | Fisher et al. .................... 707/9 |
| 6,122,664 A | * | 9/2000 | Boukobza et al. .......... 709/224 |
| 6,173,154 B1 | | 1/2001 | Kucinski et al. |
| 6,189,022 B1 | * | 2/2001 | Binns .......................... 709/100 |
| 6,195,676 B1 | * | 2/2001 | Spix et al. ................... 709/107 |
| 6,223,171 B1 | * | 4/2001 | Chaudhuri et al. ............. 707/2 |
| 6,321,218 B1 | * | 11/2001 | Guay et al. ..................... 707/2 |
| 6,356,880 B1 | | 3/2002 | Goossens et al. |
| 6,370,522 B1 | * | 4/2002 | Agarwal et al. ................ 707/2 |
| 6,377,943 B1 | * | 4/2002 | Jakobsson ...................... 707/2 |
| 6,389,430 B1 | * | 5/2002 | Parker ........................ 707/200 |
| 6,470,330 B1 | * | 10/2002 | Das et al. ....................... 707/2 |
| 6,539,371 B1 | * | 3/2003 | Bleizeffer et al. ............... 707/2 |
| 6,553,369 B1 | * | 4/2003 | Guay et al. ..................... 707/3 |
| 6,564,207 B1 | * | 5/2003 | Abdoh .......................... 707/3 |

\* cited by examiner

*Primary Examiner*—Jean M. Corrielus
*Assistant Examiner*—Anh Ly
(74) *Attorney, Agent, or Firm*—Hickman Palermo Truong & Becker LLP; Edward A. Becker

(57) ABSTRACT

An intelligent approach for collecting statistical information in information systems generally involves performing a set of administrative function steps within a "maintenance window" that is defined by one or more specified time periods. First, a set of administrative function steps to be performed are identified. The set of administrative function steps is prioritized to produce a set of prioritized administrative function steps. Then, the set of prioritized administrative function steps is performed during the maintenance window. Aspects and features of the invention include: identifying and prioritizing administrative function steps; estimated function times and maintenance window; failure prediction; environment recommendations; history information and learning techniques; saving state and context information; and user feedback.

96 Claims, 4 Drawing Sheets

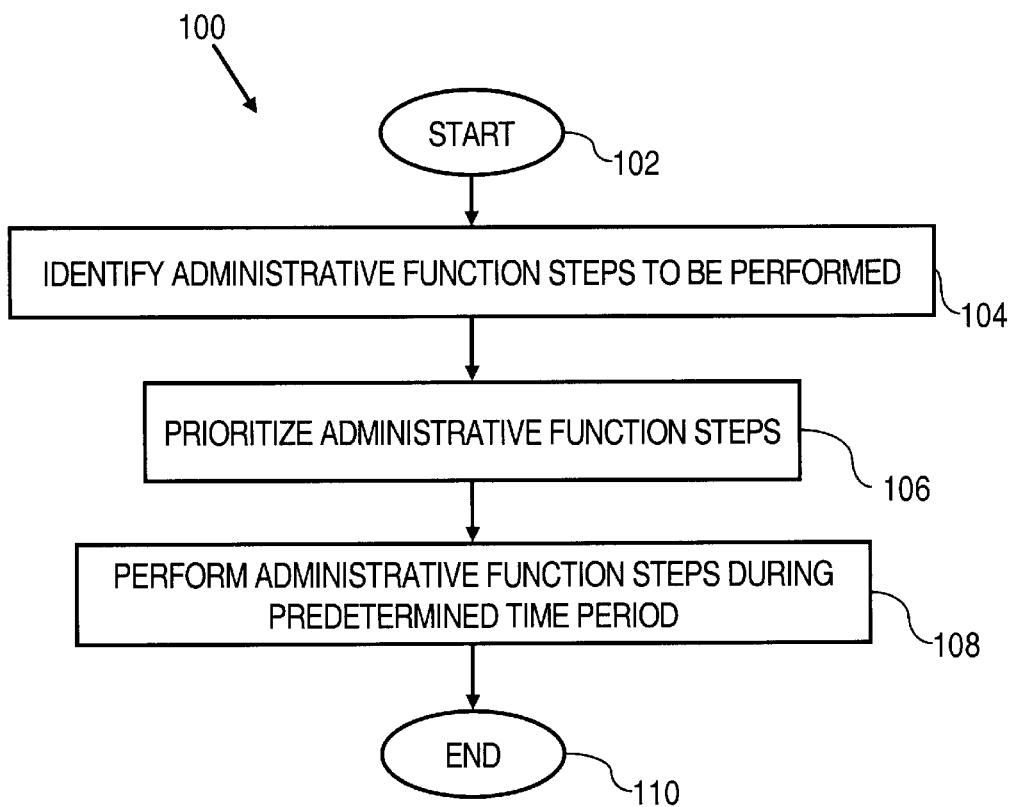

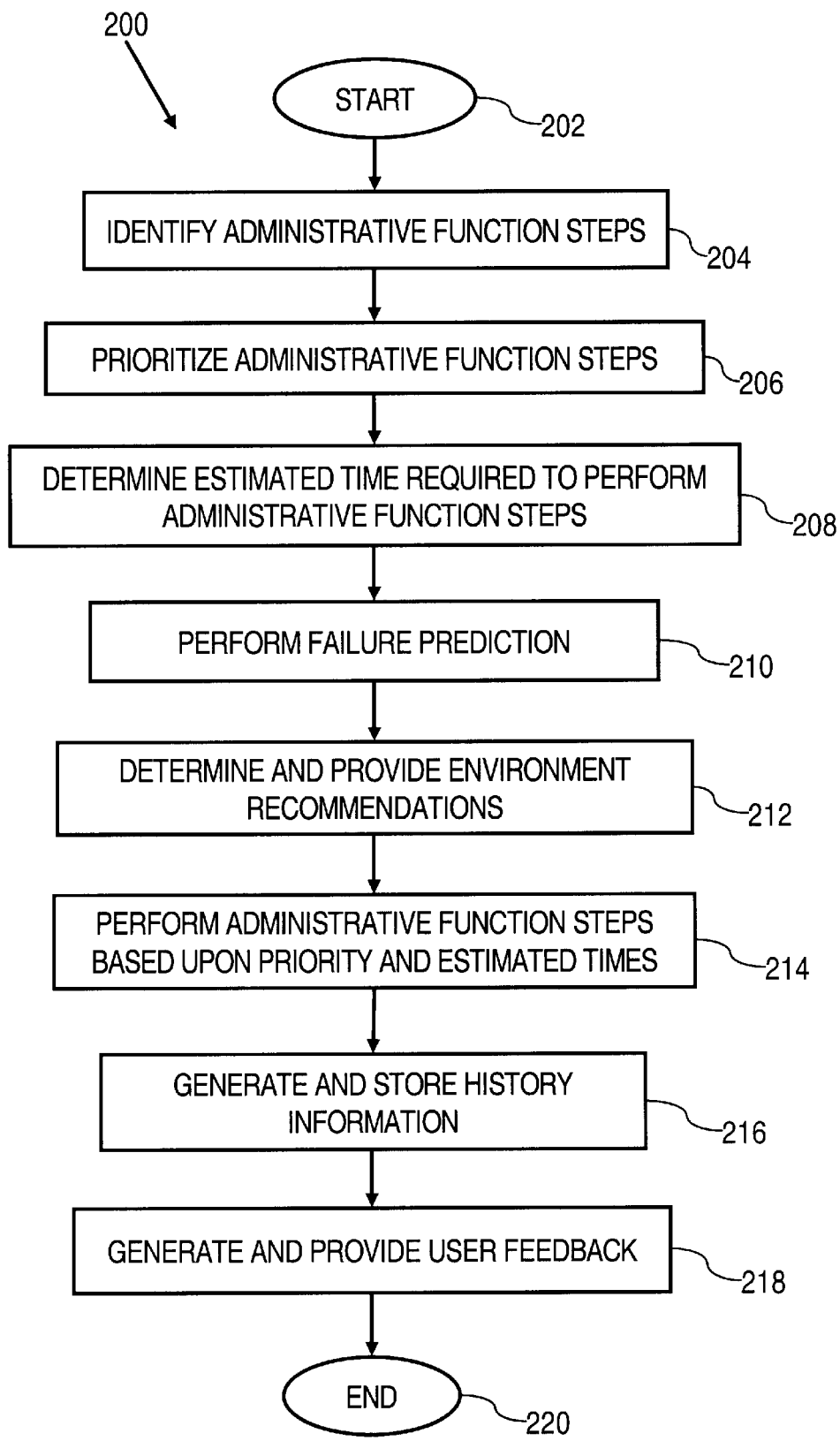

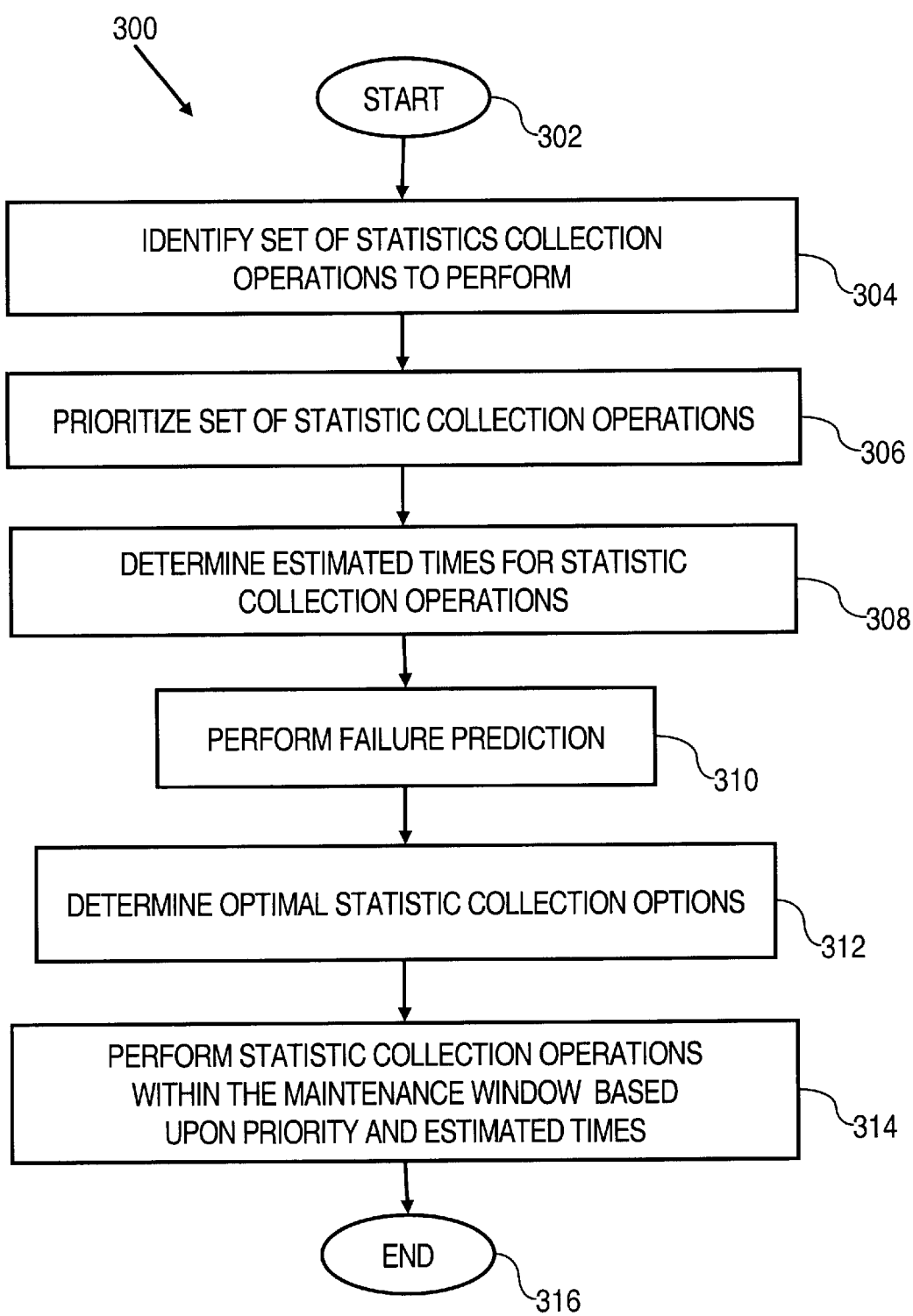

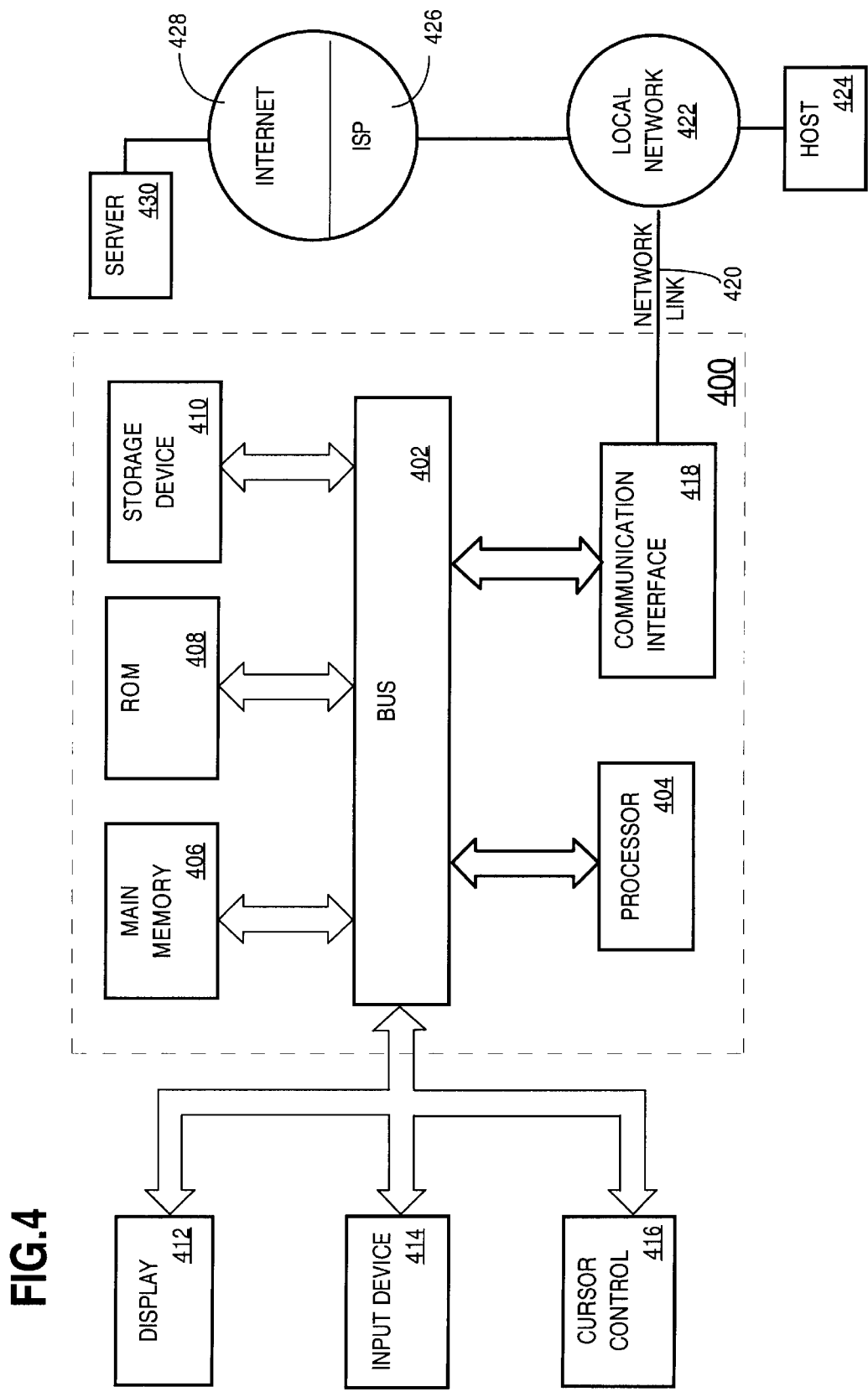

APPROACH FOR COLLECTING STATISTICAL INFORMATION IN INFORMATION SYSTEMS

RELATED APPLICATION AND CLAIM OF PRIORITY

This application is a divisional of and claims benefit of U.S. Non Provisional Application entitled "Approach for Performing Administrative Functions in Information Systems", Ser. No. 09/266,703, filed Mar. 11, 1999 now U.S. Pat. No. 6,553,369. The entire contents of this prior application are hereby incorporated by reference in its entirety for all purposes.

FIELD OF THE INVENTION

The present invention relates to information systems, and more specifically, to an approach for performing administrative functions in information systems.

BACKGROUND OF THE INVENTION

Information systems, and in particular database systems, routinely perform a variety of administrative functions to maintain their orderliness and efficiency. Examples of administrative functions include creating and updating data structures and indexes, backing up and archiving data and collecting statistical information about stored data. An administrative function includes a set of one or more administrative steps. The steps are an ordered sequence of tasks which are performed to complete the administrative function. Administrative functions such as these are sometimes collectively referred to as "housekeeping" functions.

Performing administrative functions consumes system resources and time which can interfere with other processing. This problem is exacerbated in information systems containing large amounts of data, e.g. warehousing systems and large database systems, since the amount of system resources and time attributable to performing administrative functions, such as updating indexes and gathering statistical information, usually increases as the amount of data increases.

Administrative functions are often performed during scheduled system "down times" or during times of minimal user activity to reduce interference with online user processing. However, administrative functions that are initiated during down times cannot always be completed during the allocated time period. When administrative functions cannot be completed during the allocated time period, either the administrative functions must be allowed to continue until they have completed, or be prematurely terminated. Allowing administrative functions to continue beyond scheduled down times can interfere with other time critical processing. On the other hand, prematurely terminating administrative functions can be problematic because administrative functions traditionally cannot be stopped and restarted at a later time since the data that the administrative functions operated on may change before the next scheduled down time. As a result, prematurely terminated administrative functions must be completely re-executed at a later time.

Another approach for performing administrative functions is for a system operator (SYSOP) to manually select a particular set of administrative steps of the function to be performed during an allocated time period. Whether administrative functions can be completed within scheduled down times depends upon the ability of the SYSOP to select particular administrative steps of the function that can be completed during the allocated time period. Since it can be difficult to predict the amount of time that is required to perform a particular administrative step, it can be difficult for the SYSOP to estimate the amount of time that will be required to complete a set of administrative steps.

Sometimes a SYSOP underestimates the amount of time that will be required to perform a particular administrative function and the particular administrative function must be prematurely terminated and completely re-executed at another scheduled down time. Other times a SYSOP overestimates the amount of time that will be required to perform a particular administrative function and the particular administrative function is completed earlier than expected, resulting in unused down time. One solution to this problem is for a SYSOP to manually break down an administrative function into steps and partially complete the steps within the allocated time period. However, this can require a large amount of labor and still relies upon the judgment of the SYSOP to complete tasks within the allocated time period.

Based on the need to perform administrative functions in information systems and the limitations in the prior approaches, an approach for efficiently performing administrative functions in information systems during scheduled down times is highly desirable.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 1 is a flow chart illustrating an approach for performing administrative functions according to an embodiment of the invention;

FIG. 2 is a flow chart illustrating an approach for performing administrative functions according to another embodiment of the invention;

FIG. 3 is a flow chart illustrating an approach for collecting statistical information in a database system according to an embodiment of the invention; and FIG. 4 is a block diagram of a computer system on which embodiments of the invention may be implemented.

DETAILED DESCRIPTION OF THE INVENTION

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

Functional Overview

An intelligent approach for performing administrative functions, according to an embodiment of the invention, generally involves performing a set of administrative functions within a "maintenance window." As used herein, the term "maintenance window" refers to one or more specified time periods.

FIG. 1 is a flow chart 100 illustrating the high-level steps for performing administrative functions according to an embodiment of the invention. After starting in step 102, in step 104, a set of administrative function steps to be performed are identified. In step 106 the set of administrative function steps is prioritized to produce a set of prioritized administrative function steps. In step 108, the set of prioritized administrative function steps are performed during a maintenance window. The process is complete in step 110.

This approach ensures that a set of administrative functions is performed efficiently within the maintenance window without the need for manual intervention. It should be noted that embodiments of the invention are applicable to performing administrative functions within a maintenance window as well as performing steps required to complete a particular administrative function within a maintenance window. Accordingly, aspects of the invention are first described hereinafter in the context of performing administrative functions within a maintenance window. Then, aspects of the invention are described in the context of performing steps required to collect statistical information on database objects in a database system within a maintenance window.

Detailed Description

The intelligent approach for performing administrative functions includes the following aspects that are each described in more detail hereinafter: (1) identifying and prioritizing administrative function steps; (2) estimated function times and the maintenance window; (3) failure prediction; (4) environment recommendations; (5) history information and learning techniques; (6) saving state information; and (7) providing user feedback.

1. Identifying and Prioritizing Administrative Functions

The intelligent approach for performing administrative functions includes automatically identifying and prioritizing a set of administrative function steps to be performed. The set of identified administrative function steps necessarily depends upon the requirements of a particular application. Examples of administrative functions performed in the context of a database system include organizing internal data structures, creating indexes, reorganizing data, updating indexes, performing data backups, performing data archiving and collecting statistical information about the stored data to optimize the processing of data requests. Other examples of administrative functions include a sequence of steps required to perform a particular administrative function. For example, a sequence of steps may include the steps required to update indexes.

According to one embodiment of the invention, an information system is automatically analyzed to identify a set of administrative function steps to be performed, without requiring user selection of administrative function steps. For example, an automated process may be used to identify a set of administrative function steps that need to be performed. The automatically-identified administrative function steps may be combined with administrative function steps manually selected by a user.

Once a set of administrative function steps has been identified, the administrative function steps within the set are prioritized based upon priority criteria to generate a prioritized set of administrative function steps. The priority criteria may depend upon the requirements of a particular application. According to one embodiment of the invention, the priority criteria specify a hierarchy of, for example, administrative step type or importance, that are used to prioritize the set of administrative function steps. For example, the priority criteria may specify that certain "core" administrative function attributes are to be assigned a higher priority than other administrative function attributes because the core administrative function attributes are the most important in the information system. Thus, the administrative function step having the relatively highest priority is the administrative function step that has the attributes with the highest priority. For example, in a particular information system memory management functions may be considered to have the highest relative importance. Therefore a memory management function would have a higher priority than a non-memory management function, for example a data archiving function.

2. Estimated Function Times and the Maintenance Window

The intelligent approach for performing administrative functions includes determining estimated times to perform each of the administrative function steps and performing those administrative function steps that can be completed within a maintenance window, as determined based upon the estimated times. According to one embodiment of the invention, the estimated times for performing the administrative function steps are determined based upon historical information that specifies amounts of time required to previously perform the administrative function steps. For example, a data archiving function may have required a particular amount of time to archive a specified amount of data. This information can be used to estimate the amount of time required to archive a different amount of data.

The estimated times for performing the set of administrative function steps are used to determine which of the administrative function steps should be performed within a maintenance window. According to one embodiment of the invention, the maintenance window specifies both a start time and an end time in which one or more of the administrative function steps are to be performed. The start and end times may be automatically determined or specified by a user so that administrative functions are performed at the most desirable time, for example during a period of low usage in an information system. The estimated times may be used to ensure that one or more of the administrative functions that are performed during the maintenance window and do not continue beyond the maintenance window.

According to one embodiment of the invention, the administrative functions are performed based upon both the estimated times and the priority criteria of the administrative steps. Specifically, the administrative function steps are performed in order based upon the application of the priority criteria, starting with the administrative function step having attributes with the relatively highest priority to the administrative function step having attributes with the relatively lowest priority. If a determination is made that a particular administrative function step cannot be performed within the maintenance window based upon the estimated time to perform the particular administrative function step, then the particular administrative function step is skipped and the administrative function step having attributes with the next highest priority is performed, if its estimated time indicates that it can be completed in the maintenance window.

3. Failure Prediction

The intelligent approach for performing administrative functions includes performing failure prediction prior to performing administrative function steps to detect potential failures before they occur. Performing administrative function steps necessarily requires the use of resources. As used herein, the term "resource" refers to an object that is required to process an administrative function step. For example, in a hardware context, a resource is generally a device such as a printer, disk drive or memory. In a software context, a resource is generally a set or item of data or a routine. A failure can occur when an insufficient amount of resources are available to perform an administrative function step. For example, performing a particular administrative function step may require a minimum amount of volatile memory to perform intermediate calculations. If sufficient memory cannot be allocated to perform the intermediate calculations, an error can occur.

According to an embodiment of the invention, failure prediction involves determining an estimated amount of resources required to perform each of the administrative function steps and comparing the estimated amount of resources to an amount of available resources to determine whether the administrative function steps can be performed using the available resources. If a determination is made that the estimated amount of system resources required to perform a particular administrative function step is greater than the amount of available resources, then the particular administrative function step may not be performed.

The decision whether to proceed with the processing of the particular administrative function step may be automatically determined or may be determined by a user. For example, a user may be informed through a user interface of the resource deficiency and allowed to decide whether or not to process the particular administrative function step. A user may choose not to process the particular administrative function step or delay the processing of the particular administrative function step until later in the maintenance window. For example, a user may know that additional resources will soon be made available and may choose to delay the processing of the particular administrative function step until the additional resources become available. Alternatively, the user may take steps to make additional resources available and then elect to proceed with processing of the particular administrative function step.

Once a decision has been made regarding the particular administrative function step, the remaining administrative function steps that satisfy the failure prediction testing may be performed. According to one embodiment of the invention, if a determination is made that the estimated amount of system resources required to perform a particular administrative function step is greater than the amount of available resources, then after informing the user accordingly, the administrative function step with the next highest priority may be evaluated and (if it can be completed in the maintenance window and if there are sufficient resources available for it) performed.

4. Environment Recommendations

The intelligent approach for performing administrative functions includes providing recommendations about attributes of the environment in which the administrative functions are performed to improve performing the administrative functions. As previously described, performing administrative functions necessarily requires the use of resources. In some situations, there are insufficient resources available to perform the identified set of administrative function steps. In other situations, there may be a sufficient amount of resources to perform a set of administrative function steps, but the available resources may not be optimized to perform the administrative function steps efficiently.

Therefore, according to an embodiment of the invention, environment recommendations are provided to improve the efficiency of performing the administrative function steps. The environment recommendations may include allocating additional resources as well as "tuning" available resources to improve efficiency of performing administrative function steps. For example, in a situation where there are an insufficient amount of resources available to process a particular administrative function step based upon an estimated amount of resources required to process the particular administrative function step, a recommendation may be provided to add additional resources. For example, in an information system, the recommendation might recommend that addition processing or memory resources be allocated to process the particular administrative function step. As another example, there may be sufficient memory resources to process the particular administrative function step. However, the memory resources might be configured in a way that does not allow for the most optimal processing of the particular administrative function step. For example, there might be several relatively small, non-contiguous memory resources that can be combined into a single contiguous memory resource that is better suited for processing the particular administrative function step. In this example, a recommendation may recommend that the several small memory resources be combined into a single memory resource for the purpose of processing the particular administrative function step.

5. History Information and Learning Techniques

The intelligent approach for performing administrative functions includes generating and maintaining history information about administrative functions that have been performed and employing learning techniques based upon the history information. As used herein, the term "history information" refers to any information that can be used to evaluate the performance of an administrative function.

According to one embodiment of the invention, history information is generated and maintained for administrative function steps that are performed. The history information may be evaluated to determine the performance of a particular administrative function step. For example, the actual amount of time required to perform a particular administrative function step may be compared to the estimated time to perform the particular administrative function step to determine the accuracy of the estimated time. The accuracy of future estimated times for the particular function step may be improved based upon the history information for the particular administrative function step. For example, if based upon the history information, the actual amount of time required to perform a particular administrative function step has consistently exceeded the estimated amount of time to perform the particular administrative function step by a large amount, then future estimated times for performing the particular administrative function steps may be increased. Similarly, environment recommendations provided for the particular administrative function may be compared to actual environment conditions during the processing of the particular administrative function to evaluate the effectiveness of the environment recommendations. Future environment recommendations may be further optimized for the particular administrative function. Thus, history information may be used to improve the performance of administrative functions.

6. Saving State Information

Administrative functions may be prematurely terminated for a variety of reasons. For example, an administrative function may continue executing beyond the maintenance window and be prematurely terminated to prevent affecting other user processes. This can occur when an administrative function step requires more time than expected to execute. Alternatively, there may be an insufficient amount of available resources to process an administrative function step within the maintenance window.

Accordingly, the intelligent approach for performing administrative functions includes generating and maintaining state information for administrative functions that are performed so that administrative functions that are prematurely terminated may be continued from the point where they were terminated. As used herein, the term "state information" includes all of the information associated with the execution of an administrative function including, for example, local data, memory and system resource information such as database server connections.

After a particular administrative function has prematurely terminated, the state information for the particular administrative function may be used to continue execution of the particular administrative function. The steps required to use the state information to resume execution of the particular administrative function depend upon the requirements of a particular application and embodiments of the invention are not limited to any particular requirements. For example, the state information for the particular administrative function may be loaded into volatile memory to restore the state of the particular administrative function at the time the administrative function was prematurely terminated.

7. Providing User Feedback

The intelligent approach for performing administrative functions includes providing user feedback for administrative functions that have been performed. The user feedback provides details about the administrative function steps that have been performed and may also include information about administrative function steps that have not been performed and administrative function steps that are in progress. For example, the user feedback may specify the identified administrative function steps and the determined priority. The user feedback may specify the estimated times and estimated resources required to perform the administrative function steps, the status of each administrative function step, e.g. "non-started", "in-progress" and "completed", and the actual amount of time and resources required to perform the administrative function steps that were performed. Thus, user feedback may be provided at any time prior to, during or after the execution of administrative function steps. As previously discussed, the user feedback may include failure prediction information, allowing a user to not perform one or more administrative function steps for which the estimated amount of resources required to perform the administrative function steps exceeds the available amount of resources.

The user feedback may be maintained on a non-volatile storage and periodically retrieved and provided to a user based on a user request. The stored user feedback may also be periodically deleted from the non-volatile storage. For example, a user may specify particular user feedback to be deleted or user feedback that is older than a specified age may be automatically deleted from the non-volatile storage.

The aforementioned aspects and features of the invention are now described with reference to a flow chart 200 of FIG. 2. After starting in step 202, in step 204, a set of administrative function steps to be performed is identified. In step 206 the administrative function steps are prioritized to generate prioritized administrative function steps. In step 208 estimated times required to perform the administrative function steps are determined. As previously described, this may involve revising previously determined estimates based on newly gathered information. In step 210, failure prediction is performed for the administrative function steps. In step 212, environment recommendations are determined for performing the administrative function steps. In step 214, the administrative function steps are performed during the maintenance window in order based upon characteristics of the database object and their priority and estimated times.

In step 216, history information about the performed administrative functions is generated and stored. In step 218, user feedback is generated and provided. Finally, the process is complete in step 220.

The aforementioned aspects and features of the invention are now described in the context of performing administrative functions in a database system. More specifically, the aforementioned aspects and features of the invention are now described with reference to a flow chart 300 of FIG. 3 in the context of collecting statistical information on a set of database objects to tune indexes built on the set of database objects in a way that allows queries to be processed more efficiently. As used herein, "tuning" an index refers to determining a set of indexes for a database object based upon characteristics of the database object and the composition of queries that have been processed against the database object. Accordingly, the statistical information may include, for example, the composition of queries processed against the set of database objects and the amount of time and/or system resources that were required to process queries against the set of database object.

The approach is applicable to any type of database objects, for example, tables, indexes, partitions or clusters. As used herein, the term "table" refers to data that is organized by row and column. As used herein, the term "index" refers to an ordered list of information that specifies the location of information in the database. As used herein, the term "partition" refers to a portion of a table that is specified by partition criteria. In the context of databases, partitions are sometimes referred to as "sub-tables." As used herein, the term "cluster" refers to a group of tables that share the same data blocks because they share some common columns that are often used together. According to one embodiment of the invention, a set of candidate database objects are presented to a user who may choose to exclude one or more candidate database objects to create a final set of database objects.

After starting in step 302, in step 304, a set of one or more database objects is identified for which statistical information is to be collected. In step 306, the set of database objects are prioritized based upon priority criteria to generate a prioritized set of database objects indicative of an order for collecting statistical information. The priority criteria may depend upon the requirements of a particular application. For example, the priority criteria may specify that a particular database object be assigned a higher priority than other database objects because the particular database object is historically accessed more frequently than other database objects and is likely to benefit more from index tuning that other database objects. This provides the benefit of collecting the most important statistical information first, to improve the likelihood that the most important information will be collected within the maintenance window. As described in more detail hereinafter, the estimated times are used to determine whether statistical information can be collected for a particular database object within the maintenance window.

In step 308, estimated times are determined for collecting statistical information on the set of database objects. The estimated times are used to determine whether statistical information can be collected for each of the database objects within the maintenance window. The determination of the estimated times for database objects may be based upon historical information for the database objects that indicates the amount of time that was previously required to collect statistical information on the database objects.

For example, suppose for database objects A, B, and C, the actual amount of time that was required to collect statistical information during prior collections is as follows:

|  | Prior Collection | | | |
| --- | --- | --- | --- | --- |
| Database Object | #1 | #2 | #3 | Average |
| A | 7 | 5 | 8 | 6.67 |
| B | 153 | 161 | 157 | 157 |
| C | 49 | 48 | 49 | 48.67 |

According to one embodiment of the invention, the average amount of time required to collect statistical information for the database objects is used as the estimated amount of time to collect statistical information for future collections. According to one embodiment of the invention, if based upon the estimated time, statistical information cannot be collected for the particular database object within the maintenance window, then recommendations are provided. For example, for a particular table that is too large to collect statistical information within the maintenance window, a recommended solution is to partition the particular table into smaller tables for which statistical information can be collected separately and then later combined. Other recommendations may be made and the invention is not limited to a particular type of recommendation.

In step 310, failure prediction is performed. In the context of collecting statistical information on database objects, performing failure prediction involves determining whether a sufficient amount of system resources are available to collect statistical information on a particular database object. According to an embodiment of the invention, an estimated amount of resources required to collect statistical information on a particular database object is determined. For example, collecting statistical information on a particular database object may be estimated to require a particular amount of intermediate memory to perform statistical calculations.

The estimated amount of resources required to collect statistical information on the database object is compared to an actual amount of resources available to collect statistical information on the particular database object. According to one embodiment of the invention, if the estimated amount of system resources required to collect statistical information on the particular database object is greater than the actual amount of resources available to collect statistics on the particular database object, then the statistics are not immediately collected on the particular database object. Instead, statistic collection is delayed until a sufficient amount of resources are available to collect statistical information on the particular database object. According to another embodiment of the invention, statistic collection proceeds to the database object having the next highest priority, while statistic collection for the particular database object is delayed until a sufficient amount of resources become available to collect statistics on the particular database object.

Performing failure prediction may also involve informing a user of a possible failure. For example, in the event that the estimated amount of system resources required to collect statistical information on the particular database object is greater than the actual amount of resources available to collect statistics on the particular database object, a user is informed of the condition. In addition, the user may be given the option to exclude the particular database object from statistic collection or delay statistic collection for the particular database object until sufficient resources are available to collect statistics on the particular database object.

In step 312, one or more statistical collection options are selected to improve the collection of statistics. Ideally, the selected collection options reduce the adverse affects on other processing attributable to collecting statistical information. For example, suppose collecting statistical information for a particular database object would require a relatively large amount of system resources. According to one embodiment of the invention, a portion of the statistical information is collected and used to estimate the total statistical information for the particular database object. This reduces the amount of system resources that are consumed collecting the statistical information for the particular database object which in turn reduces the likelihood of interfering with other processing. The accuracy of the estimated statistical information is then evaluated and considered during future statistical collections on the particular database object.

The collection of statistical information can involve the use of locks to secure exclusive control over database objects while statistical information is collected. If a statistic collection process obtains a lock on a particular database object, then other processes may be prevented from accessing the particular database object. Even worse, if the statistic collection process requires access to a database object that is locked by a particular process and the particular process requires access to the particular database object, a deadlock situation can occur. Accordingly, the statistical collection options may include selecting a locking scheme to reduce interference with other processes. According to one embodiment of the invention, when statistical information is to be collected for a particular database object, a determination is made whether other processes will require access to the particular database object. If no other processes require access to the particular database object, then the statistic collection process is permitted to obtain an exclusive lock on the particular database object. If another process requires access to the particular database object, then the statistic collection process is not permitted to obtain a lock on the particular database object.

In step 314, statistical information is collected on the database objects within the maintenance window based upon the previously established priority and estimated times. According to one embodiment of the invention, statistical information is first collected on the database object having the highest relative priority. Statistical information is then collected from the remaining database objects in decreasing order of priority.

If statistical information cannot be collected for a particular database object within the maintenance window based upon the estimated time for the particular database object, then as previously described, recommended solutions may be provided to allow the statistics collection to proceed. If none of the recommended solutions allow statistics to be collected for the particular database object within the maintenance window, or if the recommended options are not pursued for any reason, the collection of statistical information for the particular database object may be deferred until a later time. If statistics collection for the particular database object is deferred until a later time, then statistic collection may proceed with the database object having the next highest relative priority.

According to one embodiment of the invention, collecting statistical information on database objects includes generating and storing state information about the database objects for which statistical information is being collected so that if statistic collection for a particular database object is prematurely terminated, statistic collection for the particular database object can be continued at a later time without losing the statistical information collected up to the point of failure. State information may include for example, statistical information collected so far and may specify exactly how far the collection process had proceeded before being terminated.

If statistics collection for a particular database object is prematurely terminated, the state information for the particular database object may be used at a later time to continue collecting statistical information for the particular database object. For example, according to one embodiment of the invention, the state information is loaded into volatile memory to restore the state of the statistics collection for the particular database object at the time the statistics collection was prematurely terminated.

According to one embodiment of the invention, collecting statistical information includes maintaining an information log and providing user feedback. The information log includes information about statistical information collection operations that have been performed, are in progress, or that have not yet been performed. The information log may further identify the set of database objects for which statistical information is to be collected as well as relative priorities assigned to the database objects. According to one embodiment of the invention, the information log contains estimated times for collecting statistical information for each of the database objects as well as historical information that specifies actual times that were previously required to collect statistical information on the database objects. The information log may be maintained on either a volatile or non-volatile storage. Information from the information log may be provided to a user, for example via a graphical user interface. Information may also be periodically deleted from the information log. For example, a user may select part or all of the information to be deleted from the information log. Alternatively, information may be automatically deleted from the information log based upon the age of the information.

Implementation Mechanisms

The approach for performing administrative functions as described herein may be implemented in hardware circuitry, in computer software, or a combination of hardware circuitry and computer software. For example, the approach may be implemented as a software tool executing on a database system for collecting statistical information.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for performing administrative functions. According to one embodiment of the invention, the performance of administrative functions is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for performing administrative functions as described herein.

The received code may be executed by processor 404 as it is received, and/or stored in storage device 410, or other non-volatile storage for later execution. In this manner, computer system 400 may obtain application code in the form of a carrier wave.

The approach described herein for performing administrative functions provides several advantages over prior approaches. Performing administrative functions within a maintenance window reduces interfering with critical processing. Prioritizing administrative function steps increases the likelihood that the most important administrative function steps will be performed during the maintenance window. Failure prediction anticipates the possibility of a failure attributable to an insufficient amount of resources to perform a particular administrative function step. The environment recommendation feature allows administrative functions to be performed more efficiently while reducing the overhead burden on other processing. The use of history information and learning techniques allows administrative functions to be performed more efficiently within a maintenance window. The state saving feature allows administrative functions that are prematurely terminated to be continued from the point of termination. This eliminates the need to completely reprocess administrative functions that have prematurely terminated. Finally, user feedback provides details to a user about the administrative function steps performed, such as the priority, status, expected processing time and resources and actual processing time and resources.

In the foregoing specification, the invention has been described with reference to specific embodiments thereof. However, various modifications and changes may be made thereto without departing from the broader spirit and scope of the invention. The specification and drawings are, accordingly, to be regarded in an illustrative sense rather than a restrictive sense.

What is claimed is:

1. A method for collecting statistical information in a database system, the method comprising the computer-implemented steps of:

determining a plurality of database objects for which statistical information is to be collected;

determining an estimated amount of time that is required to collect statistical information for each of the plurality of database objects; and collecting statistical information for the plurality of database objects within one or more specified time periods based upon the estimated amount of time that is required to collect statistical information for each of the plurality of database objects.

2. The method as recited in claim 1, further comprising the computer-implemented steps of for a particular database object from the plurality of database objects, determining a set of one or more environment conditions to improve the efficiency of collecting statistical information for the particular database object, and establishing the set of one or more environment conditions prior to collecting statistical information for the particular database object.

3. The method as recited in claim 1, further comprising the computer-implemented step of saving data that indicates an actual amount of resources and an actual amount of time that were required to collect statistical information for a particular database object from the plurality of database objects.

4. The method as recited in claim 1, further comprising the computer-implemented step of reporting status information about collecting statistical information for the plurality of database objects.

5. The method as recited in claim 1, further comprising the computer-implemented steps of:

generating and storing state information associated with collecting statistical information for a particular database object from the plurality of database objects, terminating collecting statistical information for the particular database object in response to an end of the one or more specified time periods, and continuing collecting statistical information for a particular database object based upon the stored state information.

6. The method as recited in claim 1, wherein:

the method further includes the step of determining a priority for collecting statistical information for the plurality of database objects based upon priority criteria, wherein the priority criteria specify a relative importance of collecting statistical information for each of the plurality of database objects, and the step of collecting statistical information for the plurality of database objects within one or more specified time periods based upon the estimated amount of time for each of the plurality of database objects includes the step of collecting statistical information for the plurality of database objects within one or more specified time periods based upon both the determined priority and the estimated amount of time to collect statistical information for each of the plurality of database objects.

7. The method as recited in claim 6, wherein the step of collecting statistical information for the plurality of database objects is performed in decreasing order of priority.

8. The method as recited in claim 1, further including the step of only collecting statistical information for a particular database object from the plurality of database objects during the one or more specified time periods if, based upon the estimated amount of time required to collect statistical information for the particular database object, the statistical information for the particular database object can be completely collected during the one or more specified time periods.

9. The method as recited in claim 1, further comprising the computer-implemented steps of
- determining an estimated amount of resources that is required to collect statistical information for a particular database object from the plurality of database objects,
- determining an amount of resources that is available to collect statistical information for the particular database object, and
- only collecting statistical information for the particular database object if the amount of resources that is available to collect statistical information for the particular database object is equal to or greater than the estimated amount of resources that is required to collect statistical information for the particular database object.

10. A computer-readable medium for collecting statistical information in a database system, the computer-readable medium carrying one or more sequences of instructions which, when executed by one or more processors, cause the one or more processors to perform the steps of:
- determining a plurality of database objects for which statistical information is to be collected;
- determining an estimated amount of time that is required to collect statistical information for each of the plurality of database objects; and
- collecting statistical information for the plurality of database objects within one or more specified time periods based upon the estimated amount of time that is required to collect statistical information for each of the plurality of database objects.

11. The computer-readable medium as recited in claim 10, further comprising one or more sequences of additional instructions which, when executed by the one or more processors, cause the one or more processors to perform the steps of:
- for a particular database object from the plurality of database objects, determining a set of one or more environment conditions to improve the efficiency of collecting statistical information for the particular database object, and
- establishing the set of one or more environment conditions prior to collecting statistical information for the particular database object.

12. The computer-readable medium as recited in claim 10, further comprising one or more sequences of additional instructions which, when executed by the one or more processors, cause the one or more processors to perform the step of saving data that indicates an actual amount of resources and an actual amount of time that were required to collect statistical information for a particular database object from the plurality of database objects.

13. The computer-readable medium as recited in claim 10, further comprising one or more sequences of additional instructions which, when executed by the one or more processors, cause the one or more processors to perform the step of reporting status information about collecting statistical information for the plurality of database objects.

14. The computer-readable medium as recited in claim 10, further comprising one or more sequences of additional instructions which, when executed by the one or more processors, cause the one or more processors to perform the steps of:
- generating and storing state information associated with collecting statistical information for a particular database object from the plurality of database objects,
- terminating collecting statistical information for the particular database object in response to an end of the one or more specified time periods, and
- continuing collecting statistical information for a particular database object based upon the stored state information.

15. The computer-readable medium as recited in claim 10, wherein:
- the computer-readable medium further comprises one or more sequences of additional instructions which, when executed by the one or more processors, cause the one or more processors to perform the step of determining a priority for collecting statistical information for the plurality of database objects based upon priority criteria, wherein the priority criteria specify a relative importance of collecting statistical information for each of the plurality of database objects, and
- the step of collecting statistical information for the plurality of database objects within one or more specified time periods based upon the estimated amount of time for each of the plurality of database objects includes the step of collecting statistical information for the plurality of database objects within one or more specified time periods based upon both the determined priority and the estimated amount of time to collect statistical information for each of the plurality of database objects.

16. The computer-readable medium as recited in claim 15, wherein the step of collecting statistical information for the plurality of database objects is performed in decreasing order of priority.

17. The computer-readable medium as recited in claim 10, further comprising one or more sequences of additional instructions which, when executed by the one or more processors, cause the one or more processors to perform the step of only collecting statistical information for a particular database object from the plurality of database objects during the one or more specified time periods if, based upon the estimated amount of time required to collect statistical information for the particular database object, the statistical information for the particular database object can be completely collected during the one or more specified time periods.

18. The computer-readable medium as recited in claim 10, further comprising one or more sequences of additional instructions which, when executed by the one or more processors, cause the one or more processors to perform the steps of:
- determining an estimated amount of resources that is required to collect statistical information for a particular database object from the plurality of database objects,
- determining an amount of resources that is available to collect statistical information for the particular database object, and only collecting statistical information for the particular database object if the amount of resources that is available to collect statistical information for the particular database object is equal to or greater than the estimated amount of resources that is required to collect statistical information for the particular database object.

19. An apparatus for collecting statistical information in a database system, the apparatus comprising a memory carrying one or more sequences of instructions which, when executed by one or more processors, cause the one or more processors to perform the steps of:

determining a plurality of database objects for which statistical information is to be collected;

determining an estimated amount of time that is required to collect statistical information for each of the plurality of database objects; and collecting statistical information for the plurality of database objects within one or more specified time periods based upon the estimated amount of time that is required to collect statistical information for each of the plurality of database objects.

20. The apparatus as recited in claim 19, wherein the memory further includes one or more sequences of additional instructions which, when executed by the one or more processors, cause the one or more processors to perform the steps of:

for a particular database object from the plurality of database objects, determining a set of one or more environment conditions to improve the efficiency of collecting statistical information for the particular database object, and establishing the set of one or more environment conditions prior to collecting statistical information for the particular database object.

21. The apparatus as recited in claim 19, wherein the memory further includes one or more sequences of additional instructions which, when executed by the one or more processors, cause the one or more processors to perform the step of saving data that indicates an actual amount of resources and an actual amount of time that were required to collect statistical information for a particular database object from the plurality of database objects.

22. The apparatus as recited in claim 19, wherein the memory further includes one or more sequences of additional instructions which, when executed by the one or more processors, cause the one or more processors to perform the step of reporting status information about collecting statistical information for the plurality of database objects.

23. The apparatus as recited in claim 19, wherein the memory further includes one or more sequences of additional instructions which, when executed by the one or more processors, cause the one or more processors to perform the steps of:

generating and storing state information associated with collecting statistical information for a particular database object from the plurality of database objects, terminating collecting statistical information for the particular database object in response to an end of the one or more specified time periods, and continuing collecting statistical information for a particular database object based upon the stored state information.

24. The apparatus as recited in claim 19, wherein:

the memory further includes one or more sequences of additional instructions which, when executed by the one or more processors, cause the one or more processors to perform the step of determining a priority for collecting statistical information for the plurality of database objects based upon priority criteria, wherein the priority criteria specify a relative importance of collecting statistical information for each of the plurality of database objects, and the step of collecting statistical information for the plurality of database objects within one or more specified time periods based upon the estimated amount of time for each of the plurality of database objects includes the step of collecting statistical information for the plurality of database objects within one or more specified time periods based upon both the determined priority and the estimated amount of time to collect statistical information for each of the plurality of database objects.

25. The apparatus as recited in claim 24, wherein the step of collecting statistical information for the plurality of database objects is performed in decreasing order of priority.

26. The apparatus as recited in claim 19, wherein the memory further includes one or more sequences of additional instructions which, when executed by the one or more processors, cause the one or more processors to perform the step of only collecting statistical information for a particular database object from the plurality of database objects during the one or more specified time periods if, based upon the estimated amount of time required to collect statistical information for the particular database object, the statistical information for the particular database object can be completely collected during the one or more specified time periods.

27. The apparatus as recited in claim 19, wherein the memory further includes one or more sequences of additional instructions which, when executed by the one or more processors, cause the one or more processors to perform the steps of:

determining an estimated amount of resources that is required to collect statistical information for a particular database object from the plurality of database objects, determining an amount of resources that is available to collect statistical information for the particular database object, and only collecting statistical information for the particular database object if the amount of resources that is available to collect statistical information for the particular database object is equal to or greater than the estimated amount of resources that is required to collect statistical information for the particular database object.

28. A method for collecting statistical information in a database system, the method comprising the computer-implemented steps of:

determining a plurality of database objects for which statistical information is to be collected;

collecting statistical information for the plurality of database objects within one or more specified time periods; and generating state information associated with collecting statistical information for a particular database object from the plurality of database objects that is started in a particular time period, the state information specifying sufficient information about collecting statistical information for the particular database object so that if the collection of statistical information for the particular database object cannot be completed during the particular time period, then the collection of statistical information for particular database object can be halted at or before the end of the particular time period and later continued based upon the state information.

29. The method as recited in claim 28, further comprising the computer-implemented steps of for a particular database object from the plurality of database objects, determining a set of one or more environment conditions to improve the efficiency of collecting statistical information for the particular database object, and establishing the set of one or more environment conditions prior to collecting statistical information for the particular database object.

30. The method as recited in claim 28, further comprising the computer-implemented step of saving data that indicates an actual amount of resources and an actual amount of time that were required to collect statistical information for a particular database object from the plurality of database objects.

31. The method as recited in claim 28, further comprising the computer-implemented step of reporting status information about collecting statistical information for the plurality of database objects.

32. The method as recited in claim 28, wherein:

the method further includes the step of determining an estimated amount of time that is required to collect statistical information for each of the plurality of database objects, and the step of collecting statistical information for the plurality of database objects within one or more specified time periods includes the step of collecting statistical information for the plurality of database objects within one or more specified time periods based upon the estimated amount of time for each of the plurality of database objects.

33. The method as recited in claim 28, wherein:

the method further includes the step of determining a priority for collecting statistical information for the plurality of database objects based upon priority criteria, wherein the priority criteria specify a relative importance of collecting statistical information for each of the plurality of database objects, and the step of collecting statistical information for the plurality of database objects within one or more specified time periods based upon the estimated amount of time determined for each of the plurality of database objects includes the step of collecting statistical information for the plurality of database objects within one or more specified time periods based upon both the determined priority and the estimated amount of time to collect statistical information for each of the plurality of database objects.

34. The method as recited in claim 33, wherein the step of collecting statistical information for the plurality of database objects is performed in decreasing order of priority from the database object from the plurality of database objects having the relatively highest priority to the database object from the plurality of database objects having the relatively lowest priority.

35. The method as recited in claim 28, further comprising the computer-implemented steps of:

determining an estimated amount of time that is required to collect statistical information for a particular database object from the plurality of database objects, and only collecting statistical information for the particular database object during the one or more specified time periods if, based upon the estimated amount of time required to collect statistical information for the particular database object, the statistical information for the particular database object can be completely collected within the one or more specified time periods.

36. The method as recited in claim 28, further comprising the computer-implemented steps of determining an estimated amount of resources that is required to collect statistical information for a particular database object from the plurality of database objects, determining an amount of resources that is available to collect statistical information for the particular database object, and only collecting statistical information for the particular database object if the amount of resources that is available to collect statistical information for the particular database object is equal to or greater than the estimated amount of resources that is required to collect statistical information for the particular database object.

37. A computer-readable medium for collecting statistical information in a database system, the computer-readable medium carrying one or more sequences of instructions which, when executed by one or more processors, cause the one or more processors to perform the steps of:

determining a plurality of database objects for which statistical information is to be collected;

collecting statistical information for the plurality of database objects within one or more specified time periods; and generating state information associated with collecting statistical information for a particular database object from the plurality of database objects that is started in a particular time period, the state information specifying sufficient information about collecting statistical information for the particular database object so that if the collection of statistical information for the particular database object cannot be completed during the particular time period, then the collection of statistical information for particular database object can be halted at or before the end of the particular time period and later continued based upon the state information.

38. The computer-readable medium as recited in claim 37, further comprising one or more sequences of additional instructions which, when executed by the one or more processors, cause the one or more processors to perform the steps of:

for a particular database object from the plurality of database objects, determining a set of one or more environment conditions to improve the efficiency of collecting statistical information for the particular database object, and establishing the set of one or more environment conditions prior to collecting statistical information for the particular database object.

39. The computer-readable medium as recited in claim 37, further comprising one or more sequences of additional instructions which, when executed by the one or more processors, cause the one or more processors to perform the step of saving data that indicates an actual amount of resources and an actual amount of time that were required to collect statistical information for a particular database object from the plurality of database objects.

40. The computer-readable medium as recited in claim 37, further comprising one or more sequences of additional instructions which, when executed by the one or more processors, cause the one or more processors to perform the step of reporting status information about collecting statistical information for the plurality of database objects.

41. The computer-readable medium as recited in claim 37, wherein:
the computer-readable medium further comprises one or more sequences of additional instructions which, when executed by the one or more processors, cause the one or more processors to perform the step of determining an estimated amount of time that is required to collect statistical information for each of the plurality of database objects, and
the step of collecting statistical information for the plurality of database objects within one or more specified time periods includes the step of collecting statistical information for the plurality of database objects within one or more specified time periods based upon the estimated amount of time for each of the plurality of database objects.

42. The computer-readable medium as recited in claim 37, wherein:
the computer-readable medium further comprises one or more sequences of additional instructions which, when executed by the one or more processors, cause the one or more processors to perform the step of determining a priority for collecting statistical information for the plurality of database objects based upon priority criteria, wherein the priority criteria specify a relative importance of collecting statistical information for each of the plurality of database objects, and
the step of collecting statistical information for the plurality of database objects within one or more specified time periods based upon the estimated amount of time determined for each of the plurality of database objects includes the step of collecting statistical information for the plurality of database objects within one or more specified time periods based upon both the determined priority and the estimated amount of time to collect statistical information for each of the plurality of database objects.

43. The computer-readable medium as recited in claim 42, wherein the step of collecting statistical information for the plurality of database objects is performed in decreasing order of priority from the database object from the plurality of database objects having the relatively highest priority to the database object from the plurality of database objects having the relatively lowest priority.

44. The computer-readable medium as recited in claim 37, further comprising one or more sequences of additional instructions which, when executed by the one or more processors, cause the one or more processors to perform the steps of:
determining an estimated amount of time that is required to collect statistical information for a particular database object from the plurality of database objects, and
only collecting statistical information for the particular database object during the one or more specified time periods if, based upon the estimated amount of time required to collect statistical information for the particular database object, the statistical information for the particular database object can be completely collected within the one or more specified time periods.

45. The computer-readable medium as recited in claim 37, further comprising one or more sequences of additional instructions which, when executed by the one or more processors, cause the one or more processors to perform the steps of:
determining an estimated amount of resources that is required to collect statistical information for a particular database object from the plurality of database objects,
determining an amount of resources that is available to collect statistical information for the particular database object, and
only collecting statistical information for the particular database object if the amount of resources that is available to collect statistical information for the particular database object is equal to or greater than the estimated amount of resources that is required to collect statistical information for the particular database object.

46. An apparatus for collecting statistical information in a database system, the apparatus comprising a memory carrying one or more sequences of instructions which, when executed by one or more processors, cause the one or more processors to perform the steps of:
determining a plurality of database objects for which statistical information is to be collected;
collecting statistical information for the plurality of database objects within one or more specified time periods; and
generating state information associated with collecting statistical information for a particular database object from the plurality of database objects that is started in a particular time period, the state information specifying sufficient information about collecting statistical information for the particular database object so that if the collection of statistical information for the particular database object cannot be completed during the particular time period, then the collection of statistical information for particular database object can be halted at or before the end of the particular time period and later continued based upon the state information.

47. The apparatus as recited in claim 46, wherein the memory further comprises one or more sequences of additional instructions which, when executed by the one or more processors, cause the one or more processors to perform the steps of:
for a particular database object from the plurality of database objects, determining a set of one or more environment conditions to improve the efficiency of collecting statistical information for the particular database object, and
establishing the set of one or more environment conditions prior to collecting statistical information for the particular database object.

48. The apparatus as recited in claim 46, wherein the memory further comprises one or more sequences of additional instructions which, when executed by the one or more processors, cause the one or more processors to perform the step of saving data that indicates an actual amount of resources and an actual amount of time that were required to collect statistical information for a particular database object from the plurality of database objects.

49. The apparatus as recited in claim 46, wherein the memory further comprises one or more sequences of additional instructions which, when executed by the one or more processors, cause the one or more processors to perform the step of reporting status information about collecting statistical information for the plurality of database objects.

50. The apparatus as recited in claim 46, wherein:
the memory further comprises one or more sequences of additional instructions which, when executed by the one or more processors, cause the one or more processors to perform the step of determining an estimated amount of time that is required to collect statistical information for each of the plurality of database objects, and
the step of collecting statistical information for the plurality of database objects within one or more specified time periods includes the step of collecting statistical information for the plurality of database objects within one or more specified time periods based upon the estimated amount of time for each of the plurality of database objects.

51. The apparatus as recited in claim 46, wherein:
the memory further comprises one or more sequences of additional instructions which, when executed by the one or more processors, cause the one or more processors to perform the step of determining a priority for collecting statistical information for the plurality of database objects based upon priority criteria, wherein the priority criteria specify a relative importance of collecting statistical information for each of the plurality of database objects, and
the step of collecting statistical information for the plurality of database objects within one or more specified time periods based upon the estimated amount of time determined for each of the plurality of database objects includes the step of collecting statistical information for the plurality of database objects within one or more specified time periods based upon both the determined priority and the estimated amount of time to collect statistical information for each of the plurality of database objects.

52. The apparatus as recited in claim 51, wherein the step of collecting statistical information for the plurality of database objects is performed in decreasing order of priority from the database object from the plurality of database objects having the relatively highest priority to the database object from the plurality of database objects having the relatively lowest priority.

53. The apparatus as recited in claim 46, wherein the memory further comprises one or more sequences of additional instructions which, when executed by the one or more processors, cause the one or more processors to perform the steps of:
determining an estimated amount of time that is required to collect statistical information for a particular database object from the plurality of database objects, and
only collecting statistical information for the particular database object during the one or more specified time periods if, based upon the estimated amount of time required to collect statistical information for the particular database object, the statistical information for the particular database object can be completely collected within the one or more specified time periods.

54. The apparatus as recited in claim 46, wherein the memory further comprises one or more sequences of additional instructions which, when executed by the one or more processors, cause the one or more processors to perform the steps of:
determining an estimated amount of resources that is required to collect statistical information for a particular database object from the plurality of database objects,
determining an amount of resources that is available to collect statistical information for the particular database object, and
only collecting statistical information for the particular database object if the amount of resources that is available to collect statistical information for the particular database object is equal to or greater than the estimated amount of resources that is required to collect statistical information for the particular database object.

55. A method for collecting statistical information in a database system, the method comprising the computer-implemented steps of:
determining a plurality of database objects for which statistical information is to be collected;
determining an estimated amount of resources that is required to collect statistical information for each of the plurality of database objects;
determining an amount of resources that is available to collect statistical information for the plurality of database objects,
collecting statistical information for database objects from the plurality of database objects for which the amount of resources that is available to collect statistical information is equal to or greater than the estimated amount of resources that is required to collect statistical information;
generating and storing state information associated with collecting statistical information for a particular database object from the plurality of database objects;
terminating collecting statistical information for the particular database object in response to an end of the one or more specified time periods; and continuing collecting statistical information for a particular database object based upon the stored state information.

56. The method as recited in claim 55, further comprising the computer-implemented steps of
for a particular database object from the plurality of database objects, determining a set of one or more environment conditions to improve the efficiency of collecting statistical information for the particular database object, and
establishing the set of one or more environment conditions prior to collecting statistical information for the particular database object.

57. The method as recited in claim 55, further comprising the computer-implemented step of saving data that indicates an actual amount of resources and an actual amount of time that were required to collect statistical information for a particular database object from the plurality of database objects.

58. The method as recited in claim 55, further comprising the computer-implemented step of reporting status information about collecting statistical information for the plurality of database objects.

59. The method as recited in claim 55, wherein:
the method further includes the step of determining a priority for collecting statistical information for the plurality of database objects based upon priority criteria, wherein the priority criteria specify a relative importance of collecting statistical information for each of the plurality of database objects, and
the step of collecting statistical information for database objects from the plurality of database objects is performed during one or more specified time periods.

60. The method as recited in claim 59, wherein the step of collecting statistical information for the plurality of database objects is performed in decreasing order of priority from the database object from the plurality of database objects having the relatively highest priority to the database object from the plurality of database objects having the relatively lowest priority.

61. The method as recited in claim 55, further comprising the computer-implemented steps of:

determining an estimated amount of time that is required to collect statistical information for a particular database object from the plurality of database objects, and only collecting statistical information for the particular database object if, based upon the estimated amount of time required to collect statistical information for the particular database object, the statistical information for the particular database object can be collected within one or more specified time periods.

62. A computer-readable medium for collecting statistical information in a database system, the computer-readable medium carrying one or more sequences of instructions which, when executed by one or more processors, cause the one or more processors to perform the steps of:

determining a plurality of database objects for which statistical information is to be collected;

determining an estimated amount of resources that is required to collect statistical information for each of the plurality of database objects;

determining an amount of resources that is available to collect statistical information for the plurality of database objects, collecting statistical information for database objects from the plurality of database objects for which the amount of resources that is available to collect statistical information is equal to or greater than the estimated amount of resources that is required to collect statistical information;

generating and storing state information associated with collecting statistical information for a particular database object from the plurality of database objects, terminating collecting statistical information for the particular database object in response to an end of the one or more specified time periods, and continuing collecting statistical information for a particular database object based upon the stored state information.

63. The computer-readable medium as recited in claim 62, further comprising one or more sequences of additional instructions which, when executed by the one or more processors, cause the one or more processors to perform the steps of:

for a particular database object from the plurality of database objects, determining a set of one or more environment conditions to improve the efficiency of collecting statistical information for the particular database object, and establishing the set of one or more environment conditions prior to collecting statistical information for the particular database object.

64. The computer-readable medium as recited in claim 62, further comprising one or more sequences of additional instructions which, when executed by the one or more processors, cause the one or more processors to perform the step of saving data that indicates an actual amount of resources and an actual amount of time that were required to collect statistical information for a particular database object from the plurality of database objects.

65. The computer-readable medium as recited in claim 62, further comprising one or more sequences of additional instructions which, when executed by the one or more processors, cause the one or more processors to perform the step of reporting status information about collecting statistical information for the plurality of database objects.

66. The computer-readable medium as recited in claim 62, wherein:

the computer-readable medium further comprises one or more sequences of additional instructions which, when executed by the one or more processors, cause the one or more processors to perform the step of determining a priority for collecting statistical information for the plurality of database objects based upon priority criteria, wherein the priority criteria specify a relative importance of collecting statistical information for each of the plurality of database objects, and the step of collecting statistical information for database objects from the plurality of database objects is performed during one or more specified time periods.

67. The computer-readable medium as recited in claim 66, wherein the step of collecting statistical information for the plurality of database objects is performed in decreasing order of priority from the database object from the plurality of database objects having the relatively highest priority to the database object from the plurality of database objects having the relatively lowest priority.

68. The computer-readable medium as recited in claim 62, further comprising one or more sequences of additional instructions which, when executed by the one or more processors, cause the one or more processors to perform the steps of:

determining an estimated amount of time that is required to collect statistical information for a particular database object from the plurality of database objects, and only collecting statistical information for the particular database object if, based upon the estimated amount of time required to collect statistical information for the particular database object, the statistical information for the particular database object can be collected within one or more specified time periods.

69. An apparatus for collecting statistical information in a database system, the apparatus comprising a memory carrying one or more sequences of instructions which, when executed by one or more processors, cause the one or more processors to perform the steps of:

determining a plurality of database objects for which statistical information is to be collected;

determining an estimated amount of resources that is required to collect statistical information for each of the plurality of database objects;

determining an amount of resources that is available to collect statistical information for the plurality of database objects, collecting statistical information for database objects from the plurality of database objects for which the amount of resources that is available to collect statistical information is equal to or greater than the estimated amount of resources that is required to collect statistical information;

generating and storing state information associated with collecting statistical information for a particular database object from the plurality of database objects, terminating collecting statistical information for the particular database object in response to an end of the one or more specified time periods, and continuing collecting statistical information for a particular database object based upon the stored state information.

70. The apparatus as recited in claim 69, wherein the memory further comprises one or more sequences of additional instructions which, when executed by the one or more processors, cause the one or more processors to perform the steps of:
for a particular database object from the plurality of database objects, determining a set of one or more environment conditions to improve the efficiency of collecting statistical information for the particular database object, and
establishing the set of one or more environment conditions prior to collecting statistical information for the particular database object.

71. The apparatus as recited in claim 69, wherein the memory further comprises one or more sequences of additional instructions which, when executed by the one or more processors, cause the one or more processors to perform the step of saving data that indicates an actual amount of resources and an actual amount of time that were required to collect statistical information for a particular database object from the plurality of database objects.

72. The apparatus as recited in claim 69, wherein the memory further comprises one or more sequences of additional instructions which, when executed by the one or more processors, cause the one or more processors to perform the step of reporting status information about collecting statistical information for the plurality of database objects.

73. The apparatus as recited in claim 69, wherein:
the memory further comprises one or more sequences of additional instructions which, when executed by the one or more processors, cause the one or more processors to perform the step of determining a priority for collecting statistical information for the plurality of database objects based upon priority criteria, wherein the priority criteria specify a relative importance of collecting statistical information for each of the plurality of database objects, and
the step of collecting statistical information for database objects from the plurality of database objects is performed during one or more specified time periods.

74. The apparatus as recited in claim 73, wherein the step of collecting statistical information for the plurality of database objects is performed in decreasing order of priority from the database object from the plurality of database objects having the relatively highest priority to the database object from the plurality of database objects having the relatively lowest priority.

75. The apparatus as recited in claim 69, wherein the memory further comprises one or more sequences of additional instructions which, when executed by the one or more processors, cause the one or more processors to perform the steps of:
determining an estimated amount of time that is required to collect statistical information for a particular database object from the plurality of database objects, and
only collecting statistical information for the particular database object if, based upon the estimated amount of time required to collect statistical information for the particular database object, the statistical information for the particular database object can be collected within one or more specified time periods.

76. A method for collecting statistical information in a database system, the method comprising the computer-implemented steps of:
determining a plurality of database objects for which statistical information is to be collected;
determining a set of one or more environment conditions to improve the efficiency of collecting statistical information for the plurality of database objects;
establishing the set of one or more environment conditions; and
collecting statistical information for the plurality of database objects.

77. The method as recited in claim 76, further comprising the computer-implemented step of saving data that indicates an actual amount of resources and an actual amount of time that were required to collect statistical information for a particular database object from the plurality of database objects.

78. The method as recited in claim 76, further comprising the computer-implemented step of reporting status information about collecting statistical information for the plurality of database objects.

79. The method as recited in claim 76, further comprising the computer-implemented steps of:
generating and storing state information associated with collecting statistical information for a particular database object from the plurality of database objects,
terminating collecting statistical information for the particular database object in response to an end of the one or more specified time periods, and
continuing collecting statistical information for a particular database object based upon the stored state information.

80. The method as recited in claim 76, wherein:
the method further includes the step of determining a priority for collecting statistical information for the plurality of database objects based upon priority criteria, wherein the priority criteria specify a relative importance of collecting statistical information for each of the plurality of database objects, and
the step of collecting statistical information for the plurality of database objects is performed based upon the determined priority.

81. The method as recited in claim 80, wherein the step of collecting statistical information for the plurality of database objects is performed in decreasing order of priority from the database object from the plurality of database objects having the relatively highest priority to the database object from the plurality of database objects having the relatively lowest priority.

82. The method as recited in claim 76, further comprising the computer-implemented steps of
determining an estimated amount of resources that is required to collect statistical information for a particular database object from the plurality of database objects,
determining an amount of resources that is available to collect statistical information for the particular database object, and
only collecting statistical information for the particular database object if the amount of resources that is available to collect statistical information for the particular database object is equal to or greater than the estimated amount of resources that is required to collect statistical information for the particular database object.

83. A computer-readable medium for collecting statistical information in a database system, the computer-readable medium carrying one or more sequences of instructions which, when executed by one or more processors, cause the one or more processors to perform the steps of:

determining a plurality of database objects for which statistical information is to be collected;

determining a set of one or more environment conditions to improve the efficiency of collecting statistical information for the plurality of database objects;

establishing the set of one or more environment conditions; and collecting statistical information for the plurality of database objects.

84. The computer-readable medium as recited in claim 83, further comprising one or more sequences of additional instructions which, when executed by the one or more processors, cause the one or more processors to perform the step of saving data that indicates an actual amount of resources and an actual amount of time that were required to collect statistical information for a particular database object from the plurality of database objects.

85. The computer-readable medium as recited in claim 83, further comprising one or more sequences of additional instructions which, when executed by the one or more processors, cause the one or more processors to perform the step of reporting status information about collecting statistical information for the plurality of database objects.

86. The computer-readable medium as recited in claim 83, further comprising one or more sequences of additional instructions which, when executed by the one or more processors, cause the one or more processors to perform the steps of:

generating and storing state information associated with collecting statistical information for a particular database object from the plurality of database objects, terminating collecting statistical information for the particular database object in response to an end of the one or more specified time periods, and continuing collecting statistical information for a particular database object based upon the stored state information.

87. The computer-readable medium as recited in claim 83, wherein:

the computer-readable medium further comprises one or more sequences of additional instructions which, when executed by the one or more processors, cause the one or more processors to perform the step of determining a priority for collecting statistical information for the plurality of database objects based upon priority criteria, wherein the priority criteria specify a relative importance of collecting statistical information for each of the plurality of database objects, and the step of collecting statistical information for the plurality of database objects is performed based upon the determined priority.

88. The computer-readable medium as recited in claim 87, wherein the step of collecting statistical information for the plurality of database objects is performed in decreasing order of priority from the database object from the plurality of database objects having the relatively highest priority to the database object from the plurality of database objects having the relatively lowest priority.

89. The computer-readable medium as recited in claim 83, further comprising one or more sequences of additional instructions which, when executed by the one or more processors, cause the one or more processors to perform the steps of:

determining an estimated amount of resources that is required to collect statistical information for a particular database object from the plurality of database objects, determining an amount of resources that is available to collect statistical information for the particular database object, and only collecting statistical information for the particular database object if the amount of resources that is available to collect statistical information for the particular database object is equal to or greater than the estimated amount of resources that is required to collect statistical information for the particular database object.

90. An apparatus for collecting statistical information in a database system, the apparatus comprising a memory carrying one or more sequences of instructions which, when executed by one or more processors, cause the one or more processors to perform the steps of:

determining a plurality of database objects for which statistical information is to be collected;

determining a set of one or more environment conditions to improve the efficiency of collecting statistical information for the plurality of database objects;

establishing the set of one or more environment conditions; and collecting statistical information for the plurality of database objects.

91. The apparatus as recited in claim 90, wherein the memory further comprises one or more sequences of additional instructions which, when executed by the one or more processors, cause the one or more processors to perform the step of saving data that indicates an actual amount of resources and an actual amount of time that were required to collect statistical information for a particular database object from the plurality of database objects.

92. The apparatus as recited in claim 90, wherein the memory further comprises one or more sequences of additional instructions which, when executed by the one or more processors, cause the one or more processors to perform the step of reporting status information about collecting statistical information for the plurality of database objects.

93. The apparatus as recited in claim 90, wherein the memory further comprises one or more sequences of additional instructions which, when executed by the one or more processors, cause the one or more processors to perform the steps of:

generating and storing state information associated with collecting statistical information for a particular database object from the plurality of database objects, terminating collecting statistical information for the particular database object in response to an end of the one or more specified time periods, and continuing collecting statistical information for a particular database object based upon the stored state information.

94. The apparatus as recited in claim 90, wherein:

the memory further comprises one or more sequences of additional instructions which, when executed by the one or more processors, cause the one or more processors to perform the step of determining a priority for collecting statistical information for the plurality of database objects based upon priority criteria, wherein the priority criteria specify a relative importance of collecting statistical information for each of the plurality of database objects, and the step of collecting statistical information for the plurality of database objects is performed based upon the determined priority.

95. The apparatus as recited in claim 94, wherein the step of collecting statistical information for the plurality of database objects is performed in decreasing order of priority from the database object from the plurality of database objects having the relatively highest priority to the database object from the plurality of database objects having the relatively lowest priority.

96. The apparatus as recited in claim 90, wherein the memory further comprises one or more sequences of additional instructions which, when executed by the one or more processors, cause the one or more processors to perform the steps of:

determining an estimated amount of resources that is required to collect statistical information for a particular database object from the plurality of database objects, determining an amount of resources that is available to collect statistical information for the particular database object, and only collecting statistical information for the particular database object if the amount of resources that is available to collect statistical information for the particular database object is equal to or greater than the estimated amount of resources that is required to collect statistical information for the particular database object.

* * * * *